(12) United States Patent
Murata et al.

(10) Patent No.: US 10,403,988 B2
(45) Date of Patent: Sep. 3, 2019

(54) MOTOR INSULATOR FOR REDUCING RADIATION NOISE

(71) Applicant: KABUSHIKI KAISHA TOKAI RIKA DENKI SEISAKUSHO, Aichi (JP)

(72) Inventors: Kenji Murata, Aichi (JP); Yuki Kubo, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 53 days.

(21) Appl. No.: 15/414,228

(22) Filed: Jan. 24, 2017

(65) Prior Publication Data

US 2017/0214157 A1 Jul. 27, 2017

(30) Foreign Application Priority Data

Jan. 27, 2016 (JP) .................................. 2016-013031

(51) Int. Cl.
| | |
|---|---|
| *H01R 11/32* | (2006.01) |
| *H01R 13/658* | (2011.01) |
| *H02K 5/22* | (2006.01) |
| *H02K 11/22* | (2016.01) |

(52) U.S. Cl.
CPC ........... *H01R 11/32* (2013.01); *H01R 13/658* (2013.01); *H02K 5/225* (2013.01); *H02K 11/022* (2013.01)

(58) Field of Classification Search
CPC ..... H01R 13/541; H01R 13/658; H01R 11/32
USPC ............... 439/709; 310/68 D, 71, 85, 89, 64
See application file for complete search history.

(56) References Cited

U.S. PATENT DOCUMENTS

| | | | | | |
|---|---|---|---|---|---|
| 4,043,362 | A | * | 8/1977 | Senior .................. | H02G 1/1292 140/1 |
| 4,258,969 | A | * | 3/1981 | Stallard .................. | H01R 24/30 318/739 |
| 4,336,975 | A | * | 6/1982 | Casteel .................. | H01R 11/32 439/503 |
| 4,642,885 | A | * | 2/1987 | King ........................ | H02K 3/50 29/596 |
| 5,245,237 | A | * | 9/1993 | Fisher .................... | H02K 5/225 310/89 |

(Continued)

FOREIGN PATENT DOCUMENTS

| | | |
|---|---|---|
| CN | 203554135 U | 4/2014 |
| CN | 104851510 A | 8/2015 |

(Continued)

OTHER PUBLICATIONS

Office Action issued in the corresponding JP application No. 2016-013031 dated Mar. 21, 2017.

(Continued)

*Primary Examiner* — Harshad C Patel
(74) *Attorney, Agent, or Firm* — Roberts Mlotkowski Safran Cole & Calderon P.C.

(57) ABSTRACT

An insulator includes a plurality of electrical conductors and a main body. One ends of the plurality of electrical conductors are electrically connected to a ground terminal or a plurality of input terminals of a motor. The main body includes an insulating material. Other ends of the plurality of electrical conductors are disposed adjacent to each other on the main body in a direction intersecting with a direction of an output shaft of the motor.

6 Claims, 2 Drawing Sheets

(56) References Cited

U.S. PATENT DOCUMENTS

| | | | | | |
|---|---|---|---|---|---|
| 5,508,693 | A | * | 4/1996 | Wake | B60R 25/04 |
| | | | | | 123/179.1 |
| 5,852,338 | A | * | 12/1998 | Boyd, Jr. | H02K 1/165 |
| | | | | | 310/89 |
| 6,040,646 | A | * | 3/2000 | Peters | H01R 29/00 |
| | | | | | 310/68 A |
| 6,107,710 | A | * | 8/2000 | Gamboa | H02K 11/046 |
| | | | | | 310/67 R |
| 6,455,962 | B2 | * | 9/2002 | Suzuki | H02K 3/525 |
| | | | | | 310/194 |
| 6,664,682 | B2 | * | 12/2003 | Williams | H02K 5/225 |
| | | | | | 310/43 |
| 6,744,160 | B2 | * | 6/2004 | Piovesan | H02K 5/22 |
| | | | | | 310/68 C |
| 6,856,056 | B2 | * | 2/2005 | Lyle | H02K 5/225 |
| | | | | | 310/68 R |
| 6,882,070 | B2 | * | 4/2005 | Staigl, III | H02K 5/225 |
| | | | | | 200/11 R |
| 6,936,942 | B1 | * | 8/2005 | Okazaki | B62D 5/0403 |
| | | | | | 310/71 |
| 7,675,206 | B2 | * | 3/2010 | Akutsu | H02K 5/22 |
| | | | | | 310/112 |
| 9,484,783 | B2 | * | 11/2016 | Miyasaka | H02K 3/525 |
| 2004/0074255 | A1 | | 4/2004 | Goto et al. | |
| 2004/0092134 | A1 | | 5/2004 | Morikaku et al. | |
| 2008/0224553 | A1 | * | 9/2008 | Abe | H02K 5/15 |
| | | | | | 310/71 |
| 2014/0225463 | A1 | * | 8/2014 | Miyasaka | H02K 3/525 |
| | | | | | 310/52 |
| 2014/0375157 | A1 | * | 12/2014 | Taguchi | F04B 39/00 |
| | | | | | 310/71 |
| 2015/0091402 | A1 | * | 4/2015 | Kim | H02K 5/225 |
| | | | | | 310/71 |
| 2015/0194864 | A1 | * | 7/2015 | Harvey | F04D 13/0606 |
| | | | | | 417/349 |
| 2015/0235741 | A1 | | 8/2015 | Sumi et al. | |
| 2016/0099623 | A1 | * | 4/2016 | Bohm | H02K 3/28 |
| | | | | | 310/43 |

FOREIGN PATENT DOCUMENTS

| | | |
|---|---|---|
| EP | 1416614 A1 | 5/2004 |
| JP | 58-68686 A | 5/1983 |
| JP | H02-174080 A | 7/1990 |
| JP | 07-272798 A | 10/1995 |
| JP | H10-32970 A | 7/1996 |
| JP | 08-310349 A | 11/1996 |
| JP | 2001008400 A | 1/2001 |
| JP | 2003-170724 A | 6/2003 |
| JP | 2004-153891 A | 5/2004 |
| JP | 2009-201193 A | 9/2009 |

OTHER PUBLICATIONS

European Search Report from European Application No. 17153305.2 dated Jul. 4, 2017.
Office Action issued in the corresponding Japanese Patent Application No. 2016-013031 dated Sep. 26, 2017.
Chinese Office Action issued in corresponding Chinese Patent Application No. 201611128235.4 dated Aug. 28, 2018.

* cited by examiner

US 10,403,988 B2

MOTOR INSULATOR FOR REDUCING RADIATION NOISE

The present application is based on Japanese patent application No. 2016-013031 filed on Jan. 27, 2016, the entire contents of which are incorporated herein by reference.

BACKGROUND OF THE INVENTION

Technical Field

The present invention relates to an insulator that is attachable to a motor.

Background Art

A wiper control device provided with a wiper motor including a high-speed power supply input terminal, a low-speed power supply input terminal, and a ground terminal is known as a conventional technology (see Patent Document 1, for example).

CITATION LIST

Patent Literature

Patent Document 1: Japanese Unexamined Patent Application Publication No. H8-310349A

SUMMARY OF INVENTION

Technical Problem

A conventional wiper motor may be provided with two input terminals and a ground terminal in a configuration in which the two input terminals are disposed close to each other and the ground terminal is disposed at a different location. As such, if electrical wires connected to these two input terminals and the ground terminal are twisted together, a distance from the terminals to a position where the twisted portion of the electrical wires starts become longer, which may cause a problem of radiation noise.

Accordingly, an object of the present invention is to provide an insulator that reduces radiation noise.

Solution to Problem

An aspect of the present invention provides an insulator including a plurality of electrical conductors and a main body, in which one end of each of the plurality of electrically conductors connected to a ground terminal or a plurality of input terminals of a motor, the main body is formed from insulating material, and the other ends of the plurality of electrical conductors are disposed adjacent to each other on the main body in a direction intersecting with a direction of an output shaft of the motor.

Advantageous Effects of Invention

According to the present invention, radiation noise can be reduced.

DESCRIPTION OF EMBODIMENTS

Overview of Embodiments

An insulator according to the present embodiment is generally configured to include a plurality of electrical conductors and a main body. One end of each of the electrical conductors is electrically connected to a ground terminal or one of a plurality of input terminals of a motor. The main body is formed from insulating material. The other ends of the plurality of electrical conductors are disposed adjacent to each other on the main body in a direction intersecting with a direction of an output shaft of the motor.

The insulator reduces the length of the electric wire from the other end of the electrical wire to a position where twisting of the electrical wires starts compared to cases where each of the electrical wires is directly connected to the ground terminal or the input terminals of the motor and twisted together. Thus, this insulator can reduce radiation noise radiated from a portion of the electrical wires from the other ends to the position where the twisting starts.

First Embodiment

Overview of Insulator 1

Figure 1:
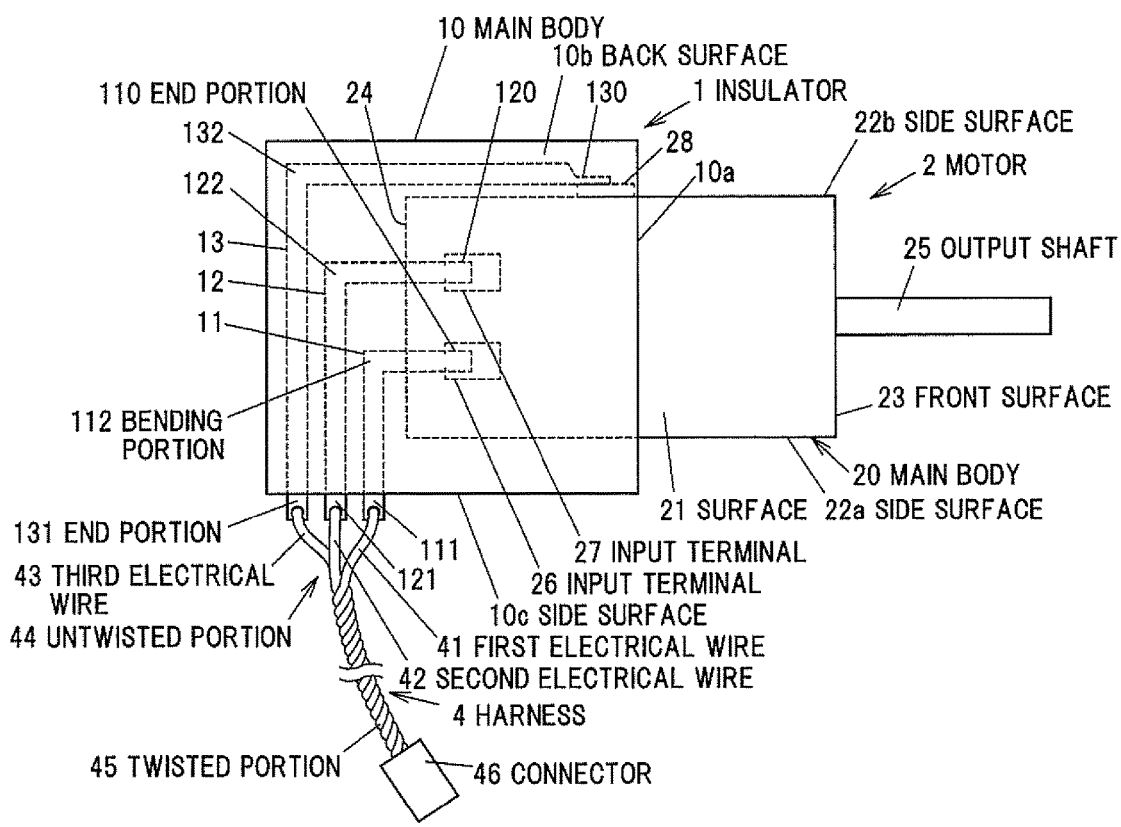
FIG. 1 is a schematic view illustrating an example of an insulator according to a first embodiment.

FIG. 1 is a schematic view illustrating an example of an insulator according to a first embodiment. FIG. 1 is a view illustrating an example in which a motor 2 is attached to an insulator 1. In the drawings associated with the following embodiment, ratios between elements in the drawings may be different from the actual ratios.

Examples of the motor 2 attached to this insulator 1 may include a motor mounted on a vehicle and used as a motor for driving a wiper device or a mirror device. The motor 2 according to the present embodiment may be a motor for driving the mirror device, for example. This motor 2 is provided with an input terminal 26, an input terminal 27, and a ground terminal 28 as illustrated in FIG. 1, for example.

The insulator 1 is, as illustrated in FIG. 1, generally configured to include electrical conductors 11, 12 and 13 and a main body 10. A first electrical conductor 11 is electrically connected to the input terminal 26 of the motor 2 at one end of the first electrical conductor 11, a second electrical conductor 12 is electrically connected to the input terminal 27 of the motor 2 at one end of the second electrical conductor 12, and a third electrical conductor 13 is electrically connected to the ground terminal 28 of the motor 2 at one end of the third electrical conductor 13. The main body 10 is formed from insulating material, and the other ends of the first electrical conductor 11 to the third electrical conductor 13 are disposed adjacent to each other on the main body 10 in a direction intersecting with a direction of an output shaft 25 of the motor 2.

The one ends of the first electrical conductor 11, the second conductor 12, and the third electrical conductor 13 are an end portion 110, an end portion 120, and an end portion 130, respectively. Also, the other ends of the first electrical conductor 11, the second conductor 12, and the third electrical conductor 13 are an end portion 111, an end portion 121, and an end portion 131, respectively.

A harness 4 including a connector 46, as illustrated in FIG. 1, is attached to the insulator 1. The harness 4 is electrically connected to a battery or the like of a vehicle via the connector 46.

Configuration of Main Body 10

The main body 10 is formed using a synthetic resin, for example. The main body 10 includes an arrangement surface 10a, which is a surface on a back side in FIG. 1, and is configured so that the motor 2 may be attached to the arrangement surface 10a. The motor 2 can be attached to the arrangement surface 10a via a holding portion disposed on the arrangement surface 10a, for example. A hook for holding the motor 2 may constitute the holding portion, for example.

The arrangement surface 10a of the main body 10 is also configured so that the electrical conductors, from the first electrical conductor 11 to the third electrical conductor 13, can be attached thereto. As a modified example, the main body 10 may be, for example, formed integrally with the electrical conductors, from the first electrical conductor 11 to the third electrical conductor 13, by insert molding, for example. In this case, for example, openings are disposed on a back surface 10b of the main body 10. Through the openings, the end portion 110 of the first electrical conductor 11 and the end portion 120 of the second electrical conductor 12 are exposed. Bonding between the end portion 110 and the input terminal 26 and the bonding between the end portion 120 and the input terminal 27 are performed via the openings. If the end portion 110 and the end portion 120 are configured to be inserted into the input terminal 26 and the input terminal 27, the openings are not disposed.

Configuration of Conductors from First Conductor 11 to Third Conductor 13

The electrical conductors, from the first electrical conductor 11 to the third electrical conductor 13, are straight-angle electrical conductors having rectangular-shaped cross-sections, for example. Also, the electrical conductors, from the first electrical conductor 11 to the third electrical conductor 13, are formed by punching out a metal plate having an electrical conductivity, such as copper, for example. The electrical conductors, from the first electrical conductor 11 to the third electrical conductor 13, have the same width, for example.

The end portions of the electrical conductors, from the end portion 111 of the first electrical conductor 11 to the end portion 131 of the third electrical conductor 13, are arranged adjacent to each other toward a side surface 10c of the main body 10, as illustrated in FIG. 1. The end portions, from the end portion 111 to the end portion 131, are arranged at equal intervals, for example. Preferably, each of the intervals is narrower than the width of each of the electrical conductors, for example. The end portions, from the end portion 111 to the end portion 131, are exposed from the main body 10, for example. Electrical wires, from a first electrical wire 41 to a third electrical wire 43, described below are connected to the corresponding end portions, from the end portion 111 to the end portion 131.

The first electrical conductor 11 includes a bending portion 112 that is bent at a substantially right angle. The input terminal 26 of the motor 2 is disposed nearest to the side surface 10c. As a result, a total length of the first electrical conductor 11, which is connected to the input terminal 26, is less than a total length of the second electrical conductor 12 or a total length of the third electrical conductor 13. If the end portion 110 is configured to be inserted into the input terminal 26 of the motor 2, the end portion 110 is bent to align in a normal direction of the arrangement surface 10a.

The second electrical conductor 12 has a bending portion 122 that is bent at a substantially right angle. The input terminal 27 of the motor 2 is disposed second nearest to the side surface 10c, following the input terminal 26. As a result, a total length of the second electrical conductor 12, which is connected to the input terminal 27, is greater than a total length of the first electrical conductor 11 and less than a total length of the third electrical conductor 13. If the end portion 120 is configured to be inserted into the input terminal 27 of the motor 2, the end portion 120 is bent to align in a normal direction of the arrangement surface 10a.

The third electrical conductor 13 has a bending portion 132 that is bent at a substantially right angle. The ground terminal 28 of the motor 2 is disposed farthest from the side surface 10c. As a result, a total length of the third electrical conductor 13, which is connected to the ground terminal 28, is greater than a total length of the first electrical conductor 11 or a total length of the second electrical conductor 12. As illustrated in FIG. 1, the ground terminal 28 is disposed not on a surface 21, on which the input terminal 26 and the input terminal 27 are disposed, but on a side surface 22a, which meets the surface 21. As a result, the end portion 130 is bent so as to be easily bonded with the ground terminal 28.

Configuration of Motor 2

Examples of the motor 2 include a DC motor. The main body 20 of the motor 2 includes, for example, the surface 21, on which the input terminal 26 and the input terminal 27 are disposed, and a back surface of the surface 21, each having a flat surface, and further includes a side surface 22a and a side surface 22b, each connecting the surface 21 and the back surface and having a curved surface. For example, the motor 2 is configured to rotate in one direction if electrical power is applied to the input terminal 26 and to rotate in a reverse direction, opposite to the direction above, if electrical power is applied to the input terminal 27.

The motor 2 includes, as illustrated in FIG. 1, the output shaft 25 near a front surface 23. The motor 2 also includes the input terminal 26 and the input terminal 27 on the surface 21 near a rear surface 24. The ground terminal 28 is disposed on the side surface 22b different from the surface 21.

Configuration of Harness 4

A general configuration of the harness 4 includes electrical conductors, from a first electrical wire 41 to a third electrical wire 43, and a connector 46. Each of the electrical conductors, from first electrical wire 41 to the third electrical wire 43, is a twisted wire, and the periphery of the twisted wire is coated with insulating material, for example. Each of the electrical wires, from the first electrical wire 41 to the third electrical wire 43, is electrically connected to the motor 2 at one end thereof via the insulator 1 and electrically connected to the connector 46 at the other end thereof.

The first electrical wire 41 is electrically connected to the end portion 111 of the first electrical conductor 11. Thus, the first electrical wire 41 is electrically connected to the input terminal 26 via the first electrical conductor 11.

The second electrical wire 42 is electrically connected to the end portion 121 of the second electrical conductor 12. Thus, the second electrical wire 42 is electrically connected to the input terminal 27 via the second electrical conductor 12.

The third electrical wire 43 is electrically connected to the end portion 131 of the third electrical conductor 13. Thus, the third electrical wire 43 is electrically connected to the ground terminal 28 via the third electrical conductor 13.

The electrical wires, from the first electrical wire 41 to the third electrical wire 43, as illustrated in FIG. 1, include a twisted portion 45 in which the electrical wires, from the first electrical wire 41 to the third electrical wire 43, are integrally twisted. A length of the first electrical wire 41 from the twisted portion 45 to the first electrical conductor 11, a length of the second electrical wire 42 from the twisted portion 45 to the second electrical conductor 12, and a length of the third electrical wire 43 from the twisted portion 45 to the third electrical conductor 13 are less than a length from a twisted portion to the input terminal 26, the input terminal 27, and the ground terminal 28 in the case where each of the electrical wires, from the first electrical wire 41 to the third electrical wire 43, is directly connected to the input terminal 26, the input terminal 27, and the ground terminal 28, respectively. This results from the fact that the input terminal 26, the input terminal 27, and the ground terminal 28 are separated from each other.

In the insulator 1, the electrical conductors, from the first electrical conductor 11 to the third electrical conductor 13, are electrically connected to the input terminal 26, the input terminal 27, and the ground terminal 28. As a result, the electrical wires, from the first electrical wire 41 to the third electrical wire 43, may be connected to the end portions, from the end portion 111 to the end portion 131, that are arranged adjacent to each other. Thus, it is possible to shorten a length of an untwisted portion 44 that is a portion of the electrical wires from the twisted portion 45 to each of the end portions, from the end portion 111 to the end portion 131. The untwisted portion 44 is a portion in which the electrical wires are not twisted.

The untwisted portion 44 easily induces radiation noise caused by current driving the motor 2 compared to the twisted portion 45. Thus, a shorter untwisted portion 44 can reduce radiation noise.

Effects of the First Embodiment

The insulator 1 according to the present embodiment can reduce radiation noise. Specifically, in the insulator 1, the length of the untwisted portion 44 is short compared to cases where each of the electrical wires is directly connected to a ground terminal or input terminals and twisted. Thus, the insulator 1 of the present embodiment can reduce radiation noise.

In the insulator 1, the third electrical conductor 13, which is connected to the ground terminal 28, is disposed adjacent to the first electrical conductor 11 and the second electrical conductor 12, which are connected to the input terminal 26 and the input terminal 27, respectively. As a result, the arrangement can reduce the occurrence of radiation noise and is less influenced by external noise compared to the case where this configuration is not adopted.

Second Embodiment

A second embodiment is different from the first embodiment in that a third electrical conductor, which is connected to the ground terminal, covers other electrical conductors.

Figure 2A:
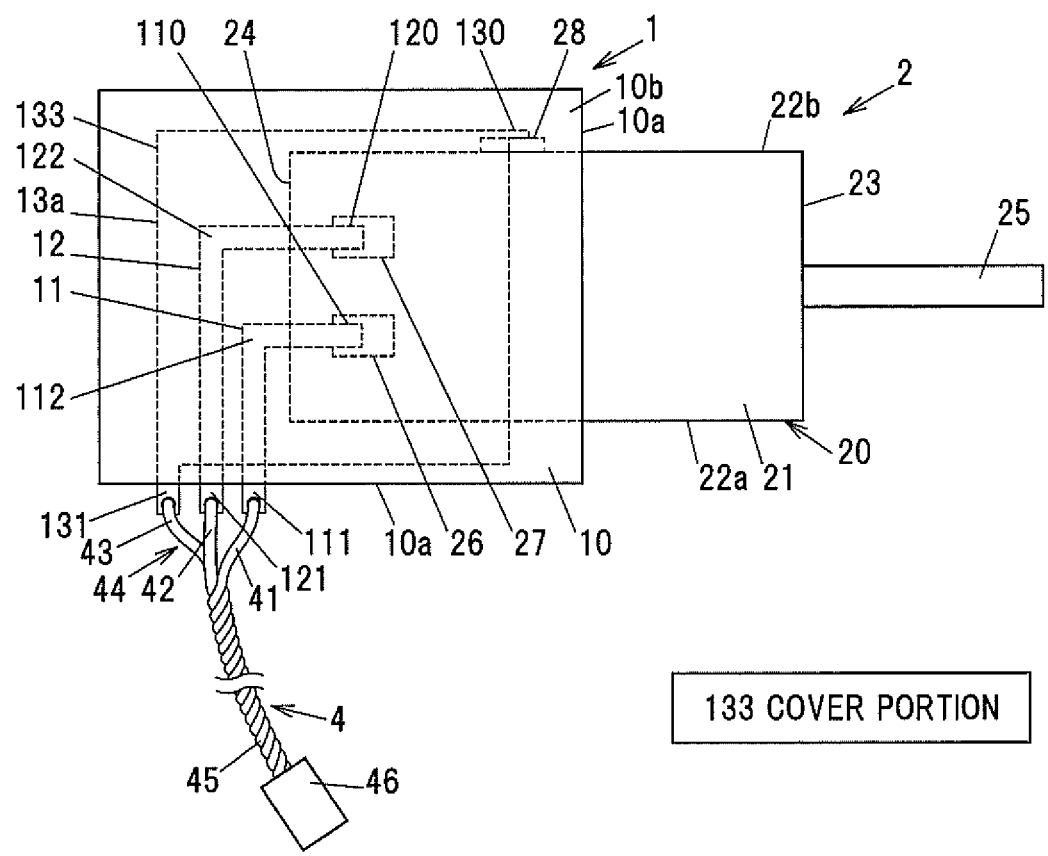
FIG. 2A is a schematic view illustrating an example of an insulator according to a second embodiment.
Figure 2B:
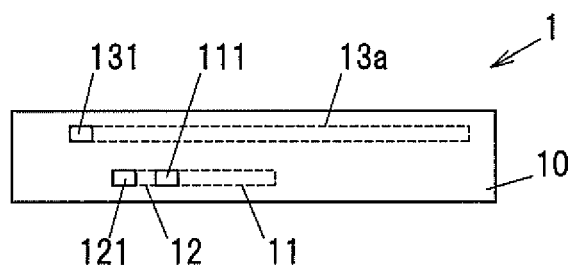
FIG. 2B is a schematic view illustrating an example in a side view of the insulator.

FIG. 2A is a schematic view illustrating an example of an insulator according to a second embodiment. FIG. 2B is a schematic view illustrating an example in a side view of the insulator. In the embodiment described below, constituents having the same functions and configurations as in the first embodiment will be given the same reference numerals as in the first embodiment, and descriptions thereof will be omitted.

As illustrated in FIG. 2A, an insulator 1 according to the present embodiment is provided with a third electrical conductor 13a, which is electrically connected to the ground terminal 28, includes a cover portion 133 having a size large enough to cover the first electrical conductor 11 and the second electrical conductor 12 disposed on the main body 10. As illustrated in FIG. 2B, the cover portion 133 is disposed on a layer different from a layer on which the first electrical conductor 11 and the second electrical conductor 12 are disposed so that the cover portion 133 covers the first electrical conductor 11 and the second electrical conductor 12, while maintaining the electrical insulation.

Note that the cover portion 133 preferably covers not less than 70% of the total area of the first electrical conductor 11 and the second electrical conductor 12, as illustrated in FIG. 2A, and more preferably covers not less than 80% of the total area, for example.

Effects of the Second Embodiment

In the insulator 1 according to the present embodiment, the third electrical conductor 13, which is connected to the ground terminal 28, covers the first electrical conductor 11 and the second electrical conductor 12. Thus the insulator 1 serves as a shield against external noise and radiation noise. Thus, this configuration can reduce radiation noise and is less influenced by external noise compared to the case where this configuration is not adopted.

Although several embodiments of the present invention and a modified example thereof have been described above, these embodiments and modified example are merely examples, and the invention according to claims is not intended to be limited thereto. Such novel embodiments and a modified example can be implemented in various other forms, and various omissions, substitutions, changes, and the like can be made without departing from the spirit and scope of the present invention. In addition, all combinations of the features described in these embodiments and modified example are not necessary to solve the problem. Furthermore, these embodiments and modified example are included within the spirit and scope of the invention and also within the invention described in the claims and the scope of equivalents thereof.

What is claimed is:

1. An insulator configured to be attached to a motor having a ground terminal and a plurality of input terminals, comprising
  a plurality of electrical conductors, each of which includes one end and an opposite end, and
  a main body,
    wherein the one end of one of the plurality of electrical conductors is electrically connected to the ground terminal, and the one end of each of the other of the plurality of electrical conductors is connected to one of the plurality of input terminals of the motor,
    wherein the main body comprises an insulating material, and the opposite ends of the plurality of electrical conductors are disposed adjacent to each other on the main body and are oriented in a direction intersecting with an axial direction of an output shaft of the motor,
  wherein one of the plurality of electrical conductors is electrically connected to the ground terminal and comprises an electrically conductive cover portion having a size large enough to cover another one of the plurality of electrical conductors disposed on the main body, and
  wherein the cover portion is disposed on a layer different from a layer on which the another electrical conductor is disposed and covers the another electrical conductor to provide a shield against external noise and radiation noise.

2. The insulator according to claim 1,
wherein the opposite ends of the plurality of electrical conductors are electrically connected to plurality of electrical wires,
wherein the plurality of electrical wires comprise a twisted portion in which the plurality of electrical wires are integrally twisted, and
wherein lengths of the plurality of electrical wires from the twisted portion to the electrical conductors are each less than lengths of the plurality of electrical wires from a twisted portion to the ground terminal and the input terminals in the case where the plurality of electrical wires are directly connected to the ground terminal and the plurality of input terminals and twisted.

3. The insulator according to claim 1, wherein the plurality of electrical conductors are exposed from the main body at the opposite ends.

4. The insulator according to claim 1, wherein the plurality of electrical conductors are integrally formed with the main body.

5. The insulator according to claim 1,
wherein the plurality of electrical conductors are insulated from each other by the insulating material in between the one ends and the opposite ends.

6. The insulator according to claim 1,
wherein the plurality of electrical conductors are arranged parallel to each other in between the one ends and the opposite ends.

* * * * *